(12) United States Patent
Mattern

(10) Patent No.: US 9,164,165 B2
(45) Date of Patent: Oct. 20, 2015

(54) SYSTEM AND METHOD FOR PROVIDING WARNING AND DIRECTIVES BASED UPON GUNFIRE DETECTION

(76) Inventor: Jeremy Keith Mattern, Houston, TX (US)

( * ) Notice: Subject to any disclaimer, the term of this patent is extended or adjusted under 35 U.S.C. 154(b) by 974 days.

(21) Appl. No.: 13/046,005

(22) Filed: Mar. 11, 2011

(65) Prior Publication Data

US 2012/0229275 A1    Sep. 13, 2012

(51) Int. Cl.
*G08B 21/00* (2006.01)
*G01S 5/18* (2006.01)
*F41A 1/00* (2006.01)
*F41B 1/00* (2006.01)

(52) U.S. Cl.
CPC ... *G01S 5/18* (2013.01); *F41A 1/00* (2013.01); *F41B 1/00* (2013.01)

(58) Field of Classification Search
CPC ............... G01S 5/18; F41A 1/00; F41B 1/00
USPC ............ 340/540, 573.1; 455/404.2; 367/127, 367/118
See application file for complete search history.

(56) References Cited

U.S. PATENT DOCUMENTS

| | | | |
|---|---|---|---|
| 2007/0072583 A1* | 3/2007 | Barbeau et al. | 455/404.2 |
| 2008/0298176 A1* | 12/2008 | Fisher et al. | 367/127 |
| 2012/0182837 A1* | 7/2012 | Calhoun et al. | 367/127 |

* cited by examiner

*Primary Examiner* — Shirley Lu
(74) *Attorney, Agent, or Firm* — Spradley PLLC; Michael Spradley

(57) ABSTRACT

A system and method for providing warnings and directives based upon gunfire detection is described herein. Specifically, gunfire detection system can comprise a memory that stores an application, and a one or more zone plans, wherein said zone plan comprises directives relating to a one or more output devices spanning across a monitored area comprising a one or more zones. The gunfire detection system can further comprise a processor that, at the direction of said application, determines whether gunfire has occurred and a location associated with said gunfire, and implements one of said zone plans based on said location.

21 Claims, 7 Drawing Sheets

SYSTEM AND METHOD FOR PROVIDING WARNING AND DIRECTIVES BASED UPON GUNFIRE DETECTION

BACKGROUND

This disclosure relates to a system and method for providing warnings and directives based upon gunfire detection.

During recent years, gun crimes occurring on school campuses, in office buildings, and other areas of mass aggregation, have increased. Since 2000, there have been over sixty campus shootings, including the shooting at Virginia Tech where 32 students lost their lives. One problem a campus may face during a shooting is its size. While a gunshot can be loud, some campuses can be of a size that gunfire could not be heard on all portions of the campus. Further, while some students may hear the noise, they may believe the noise to be some other sound such as firecrackers or construction. Aside from communicating that a shooting has occurred, campuses also face the problem of directing students where to go or what to do in the event of a shooting. Such chaos resulting from students moving without direction (such as fleeing) could prohibit first responders from reaching the scene in time, or allow individuals to move into the line of fire.

As such, it would be useful to have a system and method for providing warnings and directives based upon gunfire detection.

SUMMARY

A system and method for providing warnings and directives based upon gunfire detection is described herein.

In one embodiment, gunfire detection system can comprise a memory that stores an application, and a one or more zone plans, wherein said zone plan comprises directives relating to a one or more output devices spanning across a monitored area comprising a one or more zones. The gunfire detection system can further comprise a processor that, at the direction of said application, determines whether a gunfire has occurred and a location associated with said gunfire, and implements one of said zone plans based on said location.

Additionally, a gunfire detection method is disclosed. The method can comprise storing a one or more zone plans, wherein each of said zone plans comprise directives relating to a one or more output devices spanning across a monitored area comprising a one or more zones. The method can further comprise determining whether a gunshot has been fired and a location related to said gunshot. The method can also comprise implementing one of said zone plans based on said location.

Finally, in one embodiment, the mass notification system can comprise a computer readable storage medium having a computer readable program code embodied therein. The said computer readable program code can be adapted to be executed to implement the above mentioned gunfire detection method.

DETAILED DESCRIPTION

Described herein is a system and method for providing warnings and directives based upon gunfire detection. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
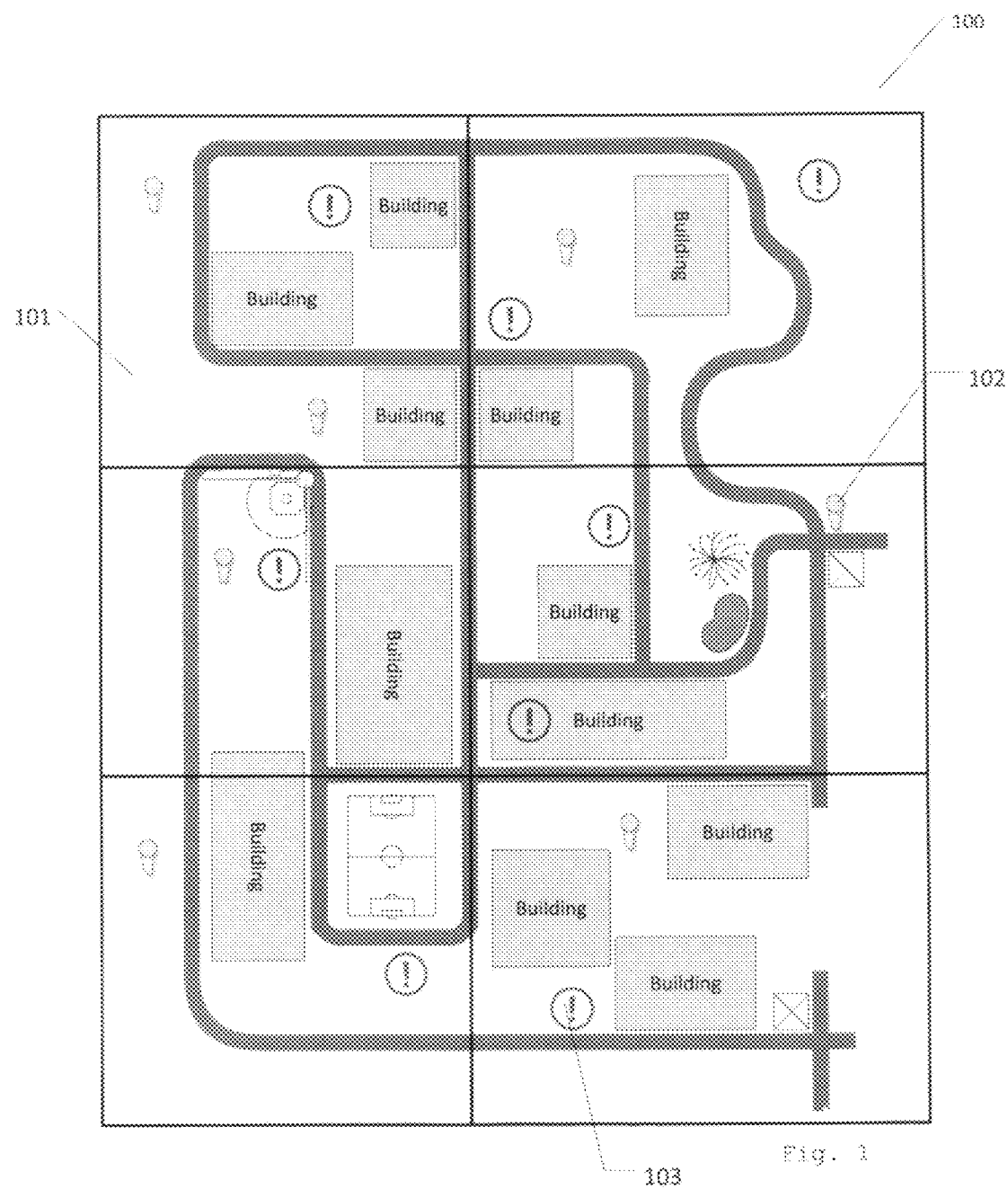
FIG. 1 illustrates a monitored area of a school campus.

FIG. 1 illustrates a monitored area 100. Monitored area 100 can comprise one or more zones 101. In one embodiment, zone 101 can comprise one or more microphones 102 and one or more output devices 103. For purposes of this disclosure monitored area 100 is defined as the total area that is within functional range of any microphone 102 or any output device 103. Further, for purposes of this disclosure, microphone 102 can include a singular microphone or a microphone array. In one embodiment, microphones 102 can be affixed on structures within monitored area 100. Such structures can be light poles and/or a mounting structure specifically manufactured for supporting microphone 102. Microphones 102 can be placed inside or outside buildings. For purposes of this disclosure, microphone 102 can be a laser microphone in one embodiment.

Figure 2:
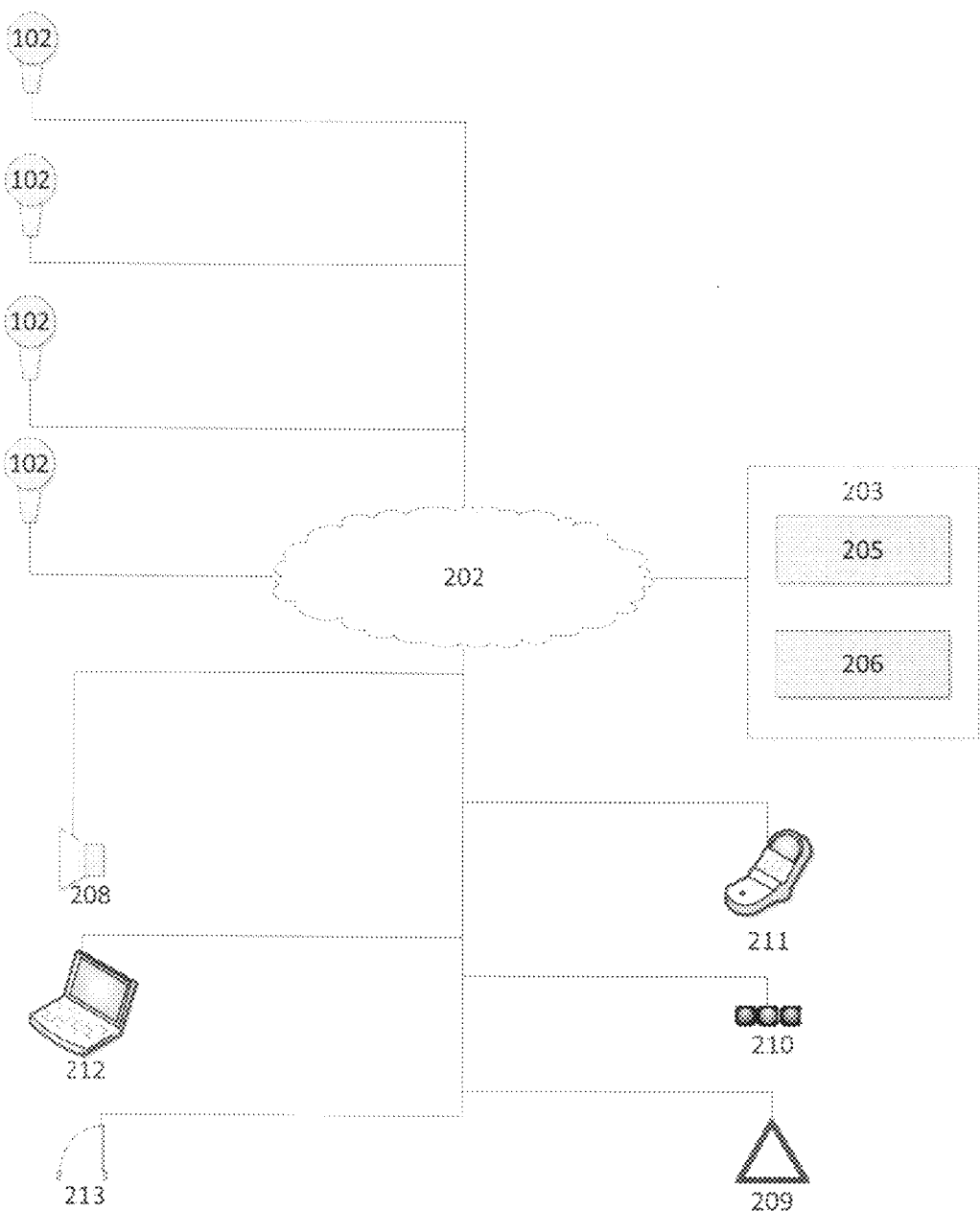
FIG. 2 illustrates a flow diagram disclosing how a gunfire noise can be collected, analyzed and determined.

FIG. 2 illustrates a flow diagram disclosing how a gunfire detection system can determine whether gunfire has occurred and cause control signals to be sent to output devices 103. In one embodiment, one or more microphones 102 can capture sound. Each microphone 102 can convert a soundwave to an electric signal and transmit such electrical signal to a gunfire detection system 203. Gunfire detection system 203 can be either remote or local. In one embodiment, wires, cables, buses, or common circuitry can connect microphone 102 to gunfire detection system 203. In such embodiment, microphone 102 can transmit the electrical signal to gunfire detection system 203 over the wires, cables, or common circuitry. Further, microphone 102 can mount directly to gunfire detection system 203. In such embodiment, microphone 102 and gunfire detection system 203 can be coupled together as one device. In another embodiment wherein gunfire detection system 203 is remote relative to microphone 102, microphone 102 can transmit electrical signal to gunfire detection system 203 via a network 202. Network 202 can be a local area network (LAN), a wide area network (WAN), a piconet, or a combination of LANs, WANs or piconets. Network 202 can be hard-wired, wireless, or a combination of both. One illustrative LAN is a network within a single business. One illustrative WAN is the Internet.

A gunfire detection system processor 205 can analyze the sound wave information within the processor-readable signal and compare the sound wave information to data stored in a gunfire detection system memory 206 to determine if the sound wave is related to gunfire. For purposes of this disclosure, gunfire detection system memory 206 can be local or remote, and can include a hard drive, disc, temporary drive, or any other suitable data storage means. If gunfire detection system 203 determines that the sound wave information is gunfire, then gunfire detection system 203 can transmit output directives to outputs 103 according to instructions in gunfire detection system memory 206. In an embodiment wherein microphone 102 is an array, gunfire detection system processor 205 can also determine the location of the gunfire relative to microphone 102 more precisely. In one embodiment, wires, cables, buses, or common circuitry can connect output devices 103 to gunfire detection system 203. In such embodiment, gunfire detection system 203 can transmit the electrical signal to output devices 103 over the wires, cables, or common circuitry. Further, in one embodiment, output device 103 can mount directly to gunfire detection system 203. In such embodiment, microphone 102 and gunfire detection system 203 can be coupled together as one device. In another embodiment wherein gunfire detection system 203 is remote relative to output devices 103, gunfire detection system 203 can transmit control signals to output devices 103 via network 202.

Output devices 103 can include but are not limited to loud speakers 208, sign displays 209, traffic controlling systems 210, phones 211, computers 212, and/or door lock actuators 213. For the purpose of this disclosure, sign display 209 can include an electronic display and/or a lighted display.

For purposes of this device, gunfire detection system 203 can be a single device or a plurality of devices, each with a processor and/or memory. The plurality of devices can be distributed across a network. In such an embodiment wherein gunfire detection system 203 is distributed across a network, each processor within the various devices can be responsible for carrying out all or a portion of instructions in memory 206, and memory 206 can be distributed across memory within the various devices.

Figure 3:
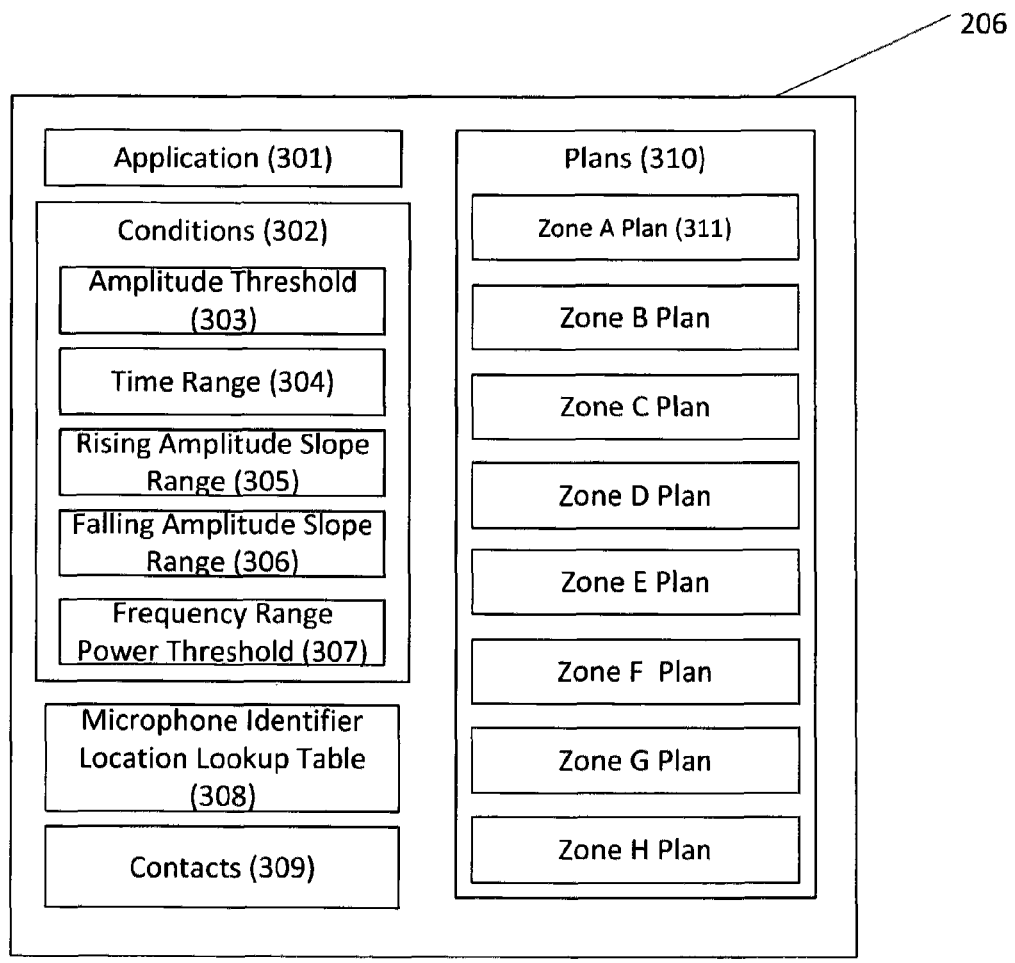
FIG. 3 illustrates one embodiment of a gunfire detection system.

FIG. 3 illustrates gunfire detection system memory 206. In one embodiment, gunfire detection system memory 206 can comprise an application 301 and conditions 302. Conditions 302 can include but are not limited to, an amplitude threshold 303, a time range 304, a rising amplitude slope range 305, a falling amplitude slope range 306, and a frequency range power threshold 307. Application 301 can analyze sound waves based on conditions 302 to determine whether sound captured by microphone 102 is gunfire. In one embodiment, gunfire detection system memory 206 can also comprise a microphone identifier-location lookup table 308. In such embodiment, a microphone identifier can be associated in the microphone identifier-location lookup table 308, with a zone. In another embodiment, a microphone identifier can be associated with a particular location. In an embodiment wherein microphone 102 is an array, gunfire detection system 102 can calculate the position of the gunfire relative to microphone 102. Combining relative position with the location of microphone 102, gunfire detection system processor 205 can determine the actual location of gunfire. Gunfire detection system memory 206 can comprises one or more contacts 309, and one or more zone plans 310. Once application 301 determines which zone experienced gunfire application 301 can select zone plan 310 accordingly. If multiple microphones 102 pickup a sound wave simultaneously, application 301 can analyze both sound waves. If both sound waves are gunfire, then application can choose location based on which microphone 102 records the sound wave with the greatest amplitude.

Figure 4:
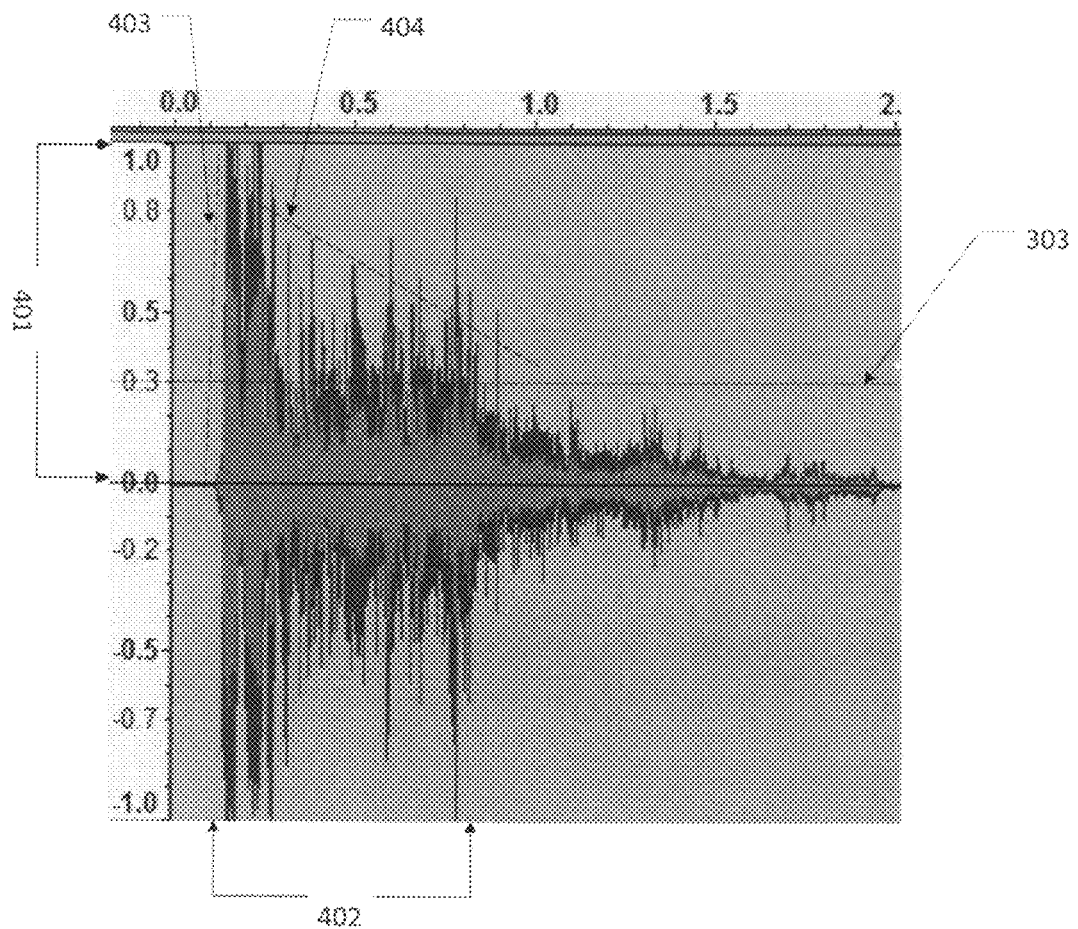
FIG. 4 illustrates an audio signal in the time domain.

FIG. 4 illustrates a sound wave in the time domain. Gunfire detection system processor 205 can analyze signal in a number of ways. In one embodiment, gunfire detection system processor 205 can analyze the sound wave in the time domain. In such embodiment, gunfire detection system processor 205 can determine whether an amplitude 401 of the sound wave exceeds predetermined amplitude threshold 303 stored in gunfire detection system memory 206. Gunfire detection system processor 205 can also measure a time period 402 wherein sound wave amplitude predominately exceeds amplitude threshold 303 or some other amplitude based threshold stored in gunfire detection system memory 206. In one embodiment, "predominately exceeds" can be determined for example by calculating a root means square analysis along with averaging such values over small time periods. Gunfire detection system processor 205 can determine if time period 402 is within time range 304. While analyzing the sound wave in the time domain, in one embodiment, gunfire detection system processor 205 can also measure and calculate the change in amplitude of the sound wave over time to find a rising slope 403 and a falling slope 404. Such calculation can be done for example by taking the difference or differences between a plurality of discrete points. Gunfire detection system processor 205 can determine whether a rising slope 403 falls within rising amplitude slope range 305 and/or falling slope 404 falls within falling amplitude slope range 306.

Figure 5:
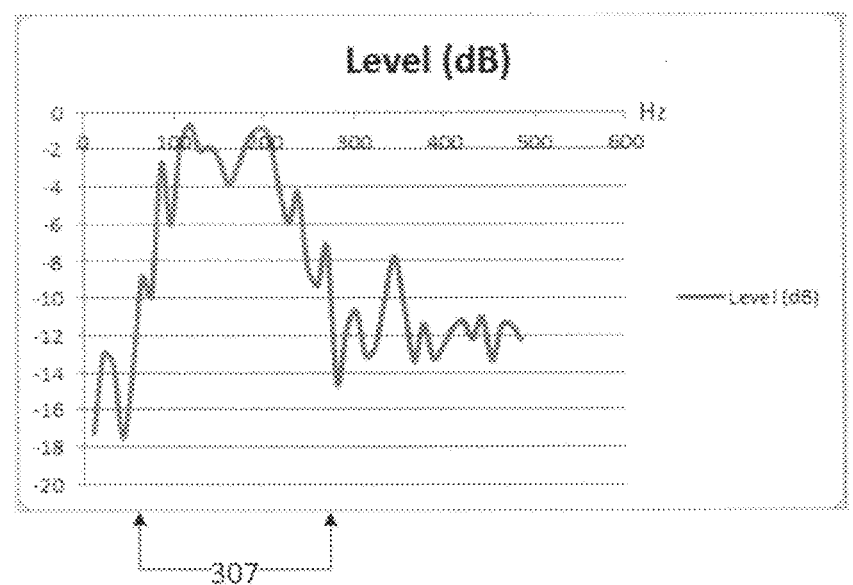
FIG. 5 illustrates an audio signal in the frequency domain.

FIG. 5 illustrates an audio signal in the frequency domain. In one embodiment, gunfire detection system processor 205 can perform a Fourier transform, such as a "Fast Fourier Transform" to analyze the sound wave in the frequency domain. A signal over a given period can be broken down into an infinite series of sine and/or cosine waves. Within the frequency domain, the magnitude of a cosine or sine wave at a particular frequency is related to the power of the signal portion at such particular frequency. A signal related to gunfire will have high power at some frequencies and low power at other frequencies. Such high power/low power frequencies can be dependent on the type of gun fired. Gunfire detection system processor 205 can compare power within a frequency range to frequency range power threshold 307 to determine whether a sound wave is incident to gunfire. In another embodiment, audio signal can be divided by analog methods including low band, baseband, and high band filters. Individual frequency bands can be analyzed separately.

Figure 6:
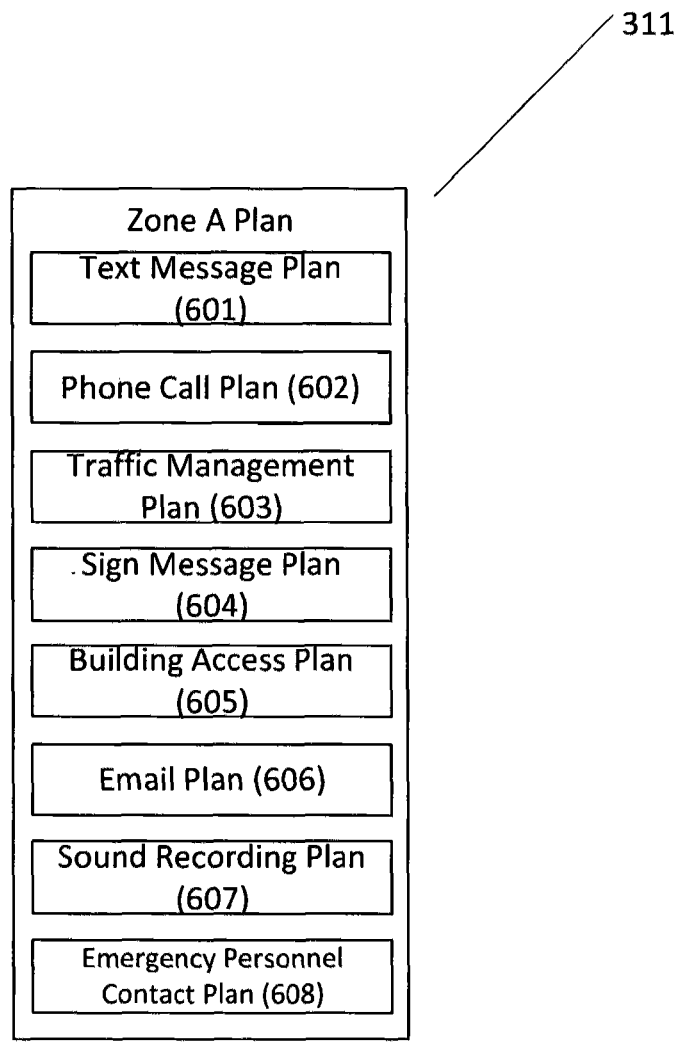
FIG. 6 illustrates a zone plan.

FIG. 6 illustrates zone plan 311. Each zone plan 310 can comprise directives relating to output devices 103. In one embodiment, zone plan 311 can comprise a text message plan 601. Such text message plan 601 can inform one or more contacts 309 of a shooting incident. In another embodiment, text message plan 601 can also include an evacuation plan. In another embodiment, zone plan 311 can comprise a phone call plan 602 to inform contacts 309 of the shooting incident, location and/or evacuation routes or shelter plans. In one embodiment, zone plan 311 can also include a traffic management plan 603. Traffic management plan 603 can be specific to said zone 101 wherein gunfire occurred. For example, traffic arrangements can be made such that access to gunfire location can be delimited or prohibited, except for pre-established emergency personnel routes. In another embodiment, zone plan 311 can also comprise a sign message plan 604. In such embodiment, monitored area 100 can comprise sign display 209 in various zones 101. Messages on each sign display 209 can vary depending on its zone 101 of residence. In another embodiment, zone plan 311 can comprise a building access plan 705. In such plan, doors can be planned to be locked or unlocked, and can be controlled by door lock actuators 213. In another embodiment, zone plan 311 can comprise an email plan 606, wherein one or more contacts 309 can be contacted by email. In another embodiment, zone plan 311 can comprise a sound recording plan 607. In the event of gunfire, a pre-record audio message stored in sound recording plan 607, a live audio message or a text generated audio message can be transmitted to one or more loud speakers 208 alerting one or more contacts 309.

Figure 7:
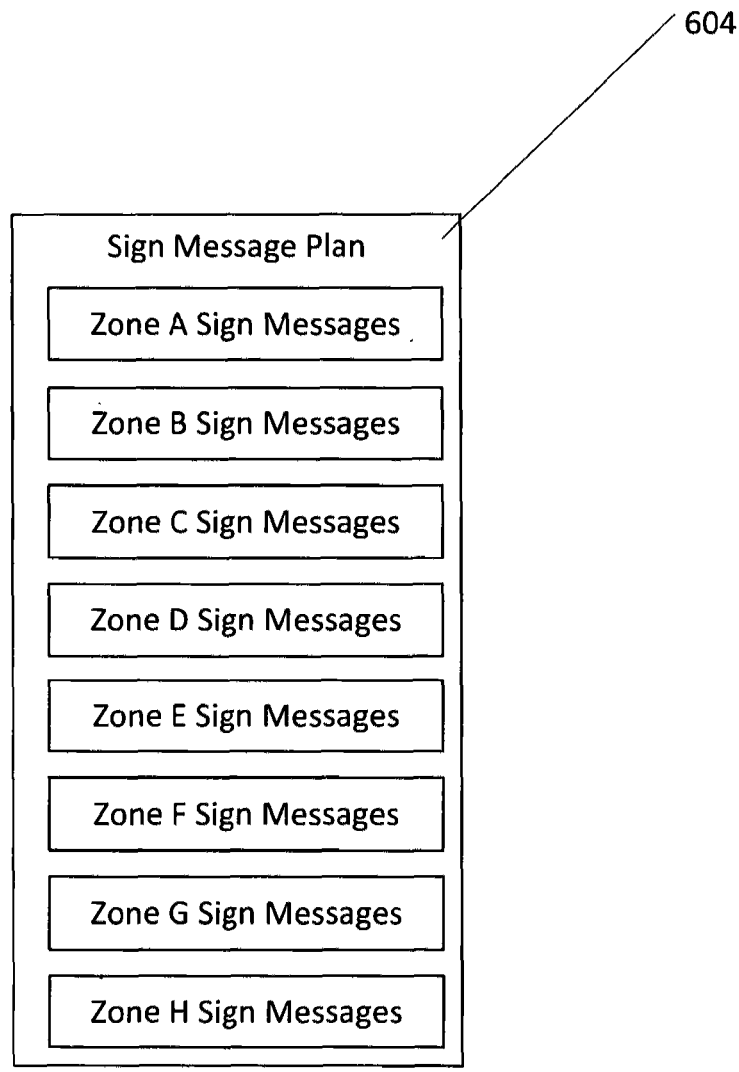
FIG. 7 illustrates a sign message plan.

FIG. 7 illustrates sign message plan 604. Like other plans 601, 602, 603, 605, 606, 607, and 608, outputs to output devices 103 within sign message plan 604 can be zone dependent. For example, a first zone may have sign display 209 with messages to stay in the area, while a second zone sign display 209 can receive messages to evacuate in a particular direction. Moreover, sign message plan 604 can also comprise one warning and directive message or multiple warning and directive messages related to zone 101.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A gunfire detection system comprising
   a memory that stores
      an application, and
      a one or more zone plans each relating to a zone within a monitored area, each of said zones comprising output devices comprising one or more door locks each controllable by a door lock actuator, wherein said zone plan comprises directives relating to locking and unlocking of said door locks by said door lock actuators;
   a processor that, at the direction of said application,
      determines whether a gunfire has occurred and a location associated with said gunfire, and
      implements one of said zone plans based on said location.

2. The gunfire detection system of claim 1 wherein said memory stores a one or more contacts.

3. The gunfire detection system of claim 2 wherein said directives comprise phone call plans; and wherein implementing one of said zone plans includes sending a first call message to a first portion of said contacts.

4. The gunfire detection system of claim 3 wherein implementing said zone plan further includes sending a second phone call message to a second portion of said contacts.

5. The gunfire detection system of claim 2 wherein said directives comprise text message plans; and wherein implementing one of said zone plans includes sending a text message to a portion of said contacts.

6. The gunfire detection system of claim 1 wherein said directives comprise speaker announcement directives; and wherein implementing one of said zone plans includes making a first speaker announcement in a first zone.

7. The gunfire detection system of claim 6 wherein implementing said zone plan further includes sending a second speaker announcement in a second zone.

8. The gunfire detection system of claim 1 wherein output devices comprises traffic signals and wherein implementing one of said directives include a traffic management plan, wherein such plan comprises control directives for said traffic signals.

9. The gunfire detection system of claim 1 wherein said traffic management plan directs motorists away from a location related to said location data.

10. The gunfire detection system of claim 1 wherein said output devices comprise one or more first sign panels in a first zone and further wherein said directives comprise a sign plan that directs a first message to be displayed on said one or more first sign panel in said one or more first zone.

11. The gunfire detection system of claim 10 wherein said output devices further comprise one or more second sign panels within a second zone and further wherein said sign plan directs a second message to be displayed on said one or more second sign panels in said one or more second zones.

12. The gunfire detection system of claim 11 wherein said first message directs a first group of people to seek shelter.

13. The gunfire detection system of claim 12 wherein said second message directs a second group of people to evacuate their location.

14. The gunfire detection system of claim 1 wherein said gunfire detection system is connected to an output device by common circuitry.

15. The gunfire detection system of claim 1 wherein said gunfire detection system transmits control signal to one or more output devices over a network.

16. A gunfire detection method comprising
   storing a one or more zone plans, wherein each of said zone plans comprise directives relating to output devices, said output devices comprising door lock actuators that control door locking and unlocking of door locks spanning across a monitored area comprising a one or more zones, each of said zones comprising one or more of said door locks; and
   determining whether a gunshot has been fired and a location related to said gunshot; and
   implementing one of said zone plans based on said location.

17. The gunfire detection method of claim 16 further comprising the steps
   recording a sound wave with a microphone,
   comparing a characteristic of said sound wave with a one or more predetermined values, and
   sending a control signal to an output device based on said comparison.

18. The gunfire detection method of claim 17 wherein said characteristic is an amplitude of said sound wave and said one or more predetermined values is an amplitude threshold.

19. The gunfire detection method of claim 17 wherein said characteristic is a period of time that said sound wave exceeds a predetermined amplitude threshold and said one or more predetermined values is said amplitude threshold, and a period range wherein said period range comprises a low value and a high value.

20. The gunfire detection method of claim 17 wherein said characteristic is an amplitude slope associated with said wave form and said one or more predetermined values is a slope range wherein said slope range comprises a low value and a high value.

21. A non-transitory computer usable storage medium having a computer readable program code embodied therein, wherein the computer readable program code is configured to be executed to implement the method of claim 16.

* * * * *